United States Patent
Schmitz et al.

(10) Patent No.: US 10,422,375 B2
(45) Date of Patent: Sep. 24, 2019

(54) BEARING ASSEMBLY

(71) Applicant: Aktiebolaget SKF, Gothenburg (SE)

(72) Inventors: Tom Schmitz, Schweinfurt (DE); Bernhard Groschek, Donnersdorf (DE); Robert Schmal, Poppenhausen (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/633,860

(22) Filed: Jun. 27, 2017

(65) Prior Publication Data

US 2017/0370407 A1 Dec. 28, 2017

(30) Foreign Application Priority Data

Jun. 28, 2016 (DE) .................... 10 2016 211 630

(51) Int. Cl.
*F16C 19/28* (2006.01)
*F16C 33/48* (2006.01)
*F16C 43/04* (2006.01)
*F16C 19/26* (2006.01)
*F16C 19/54* (2006.01)
*F16C 33/58* (2006.01)
*F16C 33/60* (2006.01)

(52) U.S. Cl.
CPC .............. *F16C 19/28* (2013.01); *F16C 19/26* (2013.01); *F16C 19/54* (2013.01); *F16C 33/485* (2013.01); *F16C 33/585* (2013.01); *F16C 43/04* (2013.01); *F16C 33/60* (2013.01); *F16C 2226/74* (2013.01)

(58) Field of Classification Search
CPC ......... F16C 33/48; F16C 33/485; F16C 19/28
See application file for complete search history.

(56) References Cited

U.S. PATENT DOCUMENTS

| | | | | |
|---|---|---|---|---|
| 1,379,945 A | * | 5/1921 | Teetsow | F16C 19/163 |
| | | | | 16/DIG. 27 |
| 1,908,474 A | * | 5/1933 | Dewees | F16C 19/54 |
| | | | | 384/501 |
| 2,075,280 A | * | 3/1937 | Green | F16C 19/184 |
| | | | | 384/504 |
| 3,958,847 A | * | 5/1976 | Cain | F16C 33/60 |
| | | | | 384/504 |

(Continued)

FOREIGN PATENT DOCUMENTS

DE 102005018042 B4 * 5/2008 ............ F16C 19/386

OTHER PUBLICATIONS

Machine Translation of DE-102005018042.*

*Primary Examiner* — Thomas R Hannon
(74) *Attorney, Agent, or Firm* — Bryan Peckjian; SKF USA Inc. Patent Dept.

(57) ABSTRACT

A multi-row bearing assembly includes first and second rolling-element bearings having first and second bearing rings and first and second rows of rolling elements therebetween, respectively, each ring having exactly one guide flange. An intermediate space exists between the first and second rows of rolling elements, and a first side of each row of rolling elements faces the intermediate space and a second side of each row of the rolling elements is remote from the intermediate space. The guide flanges of the first and third bearing rings guide the first sides of the rolling elements, and the guide flanges of the second and fourth bearing rings guide the second sides of the rolling elements.

15 Claims, 2 Drawing Sheets

(56) References Cited

U.S. PATENT DOCUMENTS

| | | | | |
|---|---|---|---|---|
| 3,986,754 A | * | 10/1976 | Torrant | F16C 19/183 |
| | | | | 29/898.063 |
| 5,071,265 A | * | 12/1991 | Bowen | F16C 19/26 |
| | | | | 384/494 |
| 5,641,239 A | * | 6/1997 | Michalek | F16C 33/60 |
| | | | | 384/499 |
| 6,979,131 B1 | * | 12/2005 | Lippert | F16C 19/28 |
| | | | | 384/551 |

* cited by examiner

BEARING ASSEMBLY

CROSS-REFERENCE

This application claims priority to German patent application no. 10 2016 211 630.4 filed on Jun. 28, 2016, the contents of which are fully incorporated herein by reference.

TECHNOLOGICAL FIELD

The present disclosure relates to a multi-row bearing assembly including at least two axially spaced rolling-element bearings, which are preferably configured as cylindrical roller bearings.

BACKGROUND

Such multi-row bearing assemblies, in particular double row, axially spaced cylindrical roller bearings, are characterized by their high load-carrying capacity and stiffness, and are used above all in machine tools, mill stands, and large transmissions. Here such cylindrical roller bearings comprise in general a bearing outer ring configured one-piece and a split bearing inner ring, or a split bearing outer ring and a one-piece bearing inner ring, between which two row of rolling elements are respectively disposed. The rolling element rows are axially spaced and form an intermediate space therebetween, whereby this bearing can also support tilting moments. Often such cylindrical roller bearings are configured as full-complement cylindrical roller bearings, whereby a large number of rolling elements is receivable in the bearing, with the result that the bearing are radially very highly load-bearing. Furthermore, such double row cylindrical roller bearings include flange-guided cylindrical rollers in order to prevent a skewing of the rolling elements. Here the bearing ring configured one-piece and the bearing ring configured split usually have a fixed central flange that supports the rolling elements centrally in the intermediate space, and flanges on the sides remote from the intermediate space.

However, it is disadvantageous with such bearing assemblies that the flange-guided bearing rings must be manufactured using a complex and expensive method.

SUMMARY

It is therefore an aspect of the present disclosure to provide a multi-row bearing assembly, in particular a multi-row axially spaced cylindrical roller bearing assembly, the manufacturing complexity and manufacturing costs of which can be reduced.

In the following a multi-row bearing assembly including at least two axially spaced rolling-element bearings is provided, which rolling-element bearings are preferably each configured as cylindrical roller bearings. Here each rolling-element bearing includes a first and a second bearing ring, between which in each case a row of rolling elements is disposed that are axially spaced and form an intermediate space therebetween.

In order to provide a multi-row bearing assembly, in particular an at least double row cylindrical roller bearing assembly, whose manufacturing complexity and manufacturing costs are significantly reduced in comparison to the bearing assemblies known from the prior art, it is provided that the first bearing rings and the second bearing rings of at least two axially adjacent rolling-element bearings are configured split and include a first and a second flange. Here the first flange is designed to support the rolling elements in the intermediate space, and the second flange is designed to support the rolling elements on a side remote from the intermediate space. Furthermore, it is provided that the first bearing ring has only the first flange and the second bearing ring only the second flange. Due to the presence of only one flange on the first bearing ring, which flange extends in the intermediate space, and only one flange on the second bearing ring, which flange is on the side remote from the intermediate space, it is possible to produce the respective bearing rings more quickly and economically, since a technically complex as well as work- and time-intensive forming of a further flange on each bearing ring is omitted. Thus the respective bearing rings can be processed using a "conjugated combination grinding," using which the rolling-element raceways and the flanges are processed together. Furthermore, the split configuration of the first and of the second bearing rings makes possible a simpler-to-produce bearing assembly, since two simple-to-manufacture first and second bearing rings are disposable in the bearing assembly in a mirror-symmetric manner.

At least two of the axially spaced first and/or second bearing rings of the bearing assembly are connected to one another by material bond and/or by friction fit and/or by interference fit. It is particularly advantageous here if, as a further preferred exemplary embodiment shows, at least two of the axially adjacent first bearing rings and/or at least two of the axially adjacent second bearing rings are connected to one another in the axial direction by interference fit. It is thereby possible to connect axially adjacent first and/or second bearing rings stably and in a simple manner, with the result that a bearing assembly having high load-bearing capacity and stiffness can be provided.

In order to connect the two axially spaced bearing rings to each other particularly simply and cost-effectively, according to a further preferred exemplary embodiment at least one retaining ring can be provided that connects the two axially adjacent bearing rings, preferably via a clip mechanism.

In a further preferred exemplary embodiment at least the two axially adjacent bearing rings include a recess, preferably an annular groove, into which the retaining ring engages. The recess can be incorporated in the respective bearing ring in a simple manner, for example, by turning. Alternatively it is also possible to form discrete, preferably circumferentially distributed recesses in the respective bearing ring, into which recesses discretely formed retaining elements then engage.

Here according to a further preferred exemplary embodiment a recess can respectively be disposed on one of the flanges of the bearing rings. Here the recess is preferably disposed on a radially inwardly directed surface of the flange. A stable connection of two axially adjacent bearing rings can thereby be provided on a bearing inner side. This is preferred in particular if the first bearing ring is configured as a bearing outer ring in order to connect two axially adjacent bearing outer rings to each other in a stable and cost-effective manner.

Alternatively or additionally, as a further preferred exemplary embodiment shows, the recess can be disposed on an outer surface of the bearing ring, which outer surface faces away from the bearing interior. This is advantageous if the flange is configured small, for example, for reasons related to installation space. Furthermore, disposing the recess on the outer surface remote from the bearing interior is preferred in particular when the second bearing ring is configured as a bearing inner ring, since in operation the two bearing rings are thereby stably held together and cannot expand away from the bearing interior.

Furthermore, according to a further preferred exemplary embodiment it is alternatively or additionally possible to dispose the recess on an outer side of at least two axially adjacent bearing rings, which outer side faces the bearing interior. This can be advantageous for reasons related to installation space.

In a further preferred exemplary embodiment the bearing assembly includes at least two axially adjacent rolling-element bearings, which, as further already described above, are disposed mirror-symmetrically with respect to each other.

According to a further preferred exemplary embodiment the first bearing ring is configured as a bearing outer ring and the second bearing ring as a bearing inner ring. Here the flange of the bearing outer ring supports the rolling elements in the intermediate space, and the flange of the bearing inner ring supports the rolling elements on one of the sides remote from the intermediate space. Such a configuration of the bearing assembly is preferred in particular for the supporting of cable sheaves.

Alternatively as a further exemplary embodiment shows it is also possible to configure the first bearing ring as a bearing inner ring and the second bearing ring as a bearing outer ring. In this case the flange of the bearing inner ring supports the rolling elements in the intermediate space, and the flange of the bearing outer ring supports the rolling elements on the side remote from the intermediate space.

In one preferred exemplary embodiment the bearing assembly is configured as a cable sheave bearing. A cable sheave bearing is generally a bearing that is disposed in a cable sheave that is used, for example, in a crane. Cable sheave bearings are used in particular to reliably support load combinations of radial, axial, and tipping forces. The cable sheave bearing is preferably configured as an at least double-row cylindrical roller bearing.

In general the rolling elements, in particular in cylindrical roller bearings, can be received in a bearing cage or designed full-complement. According to the present disclosure it is preferred when at least two adjacent rolling-element bearings, in particular cylindrical roller bearings, are designed full-complement. It is thereby possible to provide a largest-possible number of rolling elements in the rolling-element bearing, with the result that a bearing assembly having a particularly high load-bearing capacity is providable, which bearing assembly is also particularly well suited for use in space-saving constructions.

In one preferred exemplary embodiment the bearing assembly comprises a first rolling-element bearing having a first bearing ring and a second bearing ring and a first row of rolling elements between the first bearing ring and the second bearing ring, the first bearing ring and the second bearing ring each having exactly one rolling-element guide flange. The assembly also includes a second rolling-element bearing axially adjacent to and formed separately from the first rolling-element bearing, the second rolling-element bearing having a third bearing ring and a fourth bearing ring and a second row of rolling elements between the third bearing ring and the fourth bearing ring, the third bearing ring and the fourth bearing ring each having exactly one rolling-element guide flange. An intermediate space exists between the first row of rolling elements and the second row of rolling elements. The first row of rolling elements has a first side facing the intermediate space and a second side remote from the intermediate space, and the second row of rolling elements has a first side facing the intermediate space and a second side remote from the intermediate space. The guide flange of the first bearing ring is configured to guide the first side of the first row of rolling elements and the guide flange of the third bearing ring is configured to guide the first side of the second row of rolling elements and the guide flange of the second bearing ring is configured to guide the second side of the first row of rolling elements and the guide flange of the fourth bearing ring is configured to guide the second side of the second row of rolling elements.

In one preferred exemplary embodiment the bearing assembly comprises a first rolling-element bearing having a first bearing ring and a second bearing ring and a first row of rolling elements between the first bearing ring and the second bearing ring, and a second rolling-element bearing axially adjacent to and formed separately from the first rolling-element bearing, the second rolling-element bearing having a third bearing ring and a fourth bearing ring and a second row of rolling elements between the third bearing ring and the fourth bearing ring, and an intermediate space between the first row of rolling elements and the second row of rolling elements. The first row of rolling elements has a first side facing the intermediate space and a second side remote from the intermediate space, and the second row of rolling elements has a first side facing the intermediate space and a second side remote from the intermediate space. The first bearing ring includes a first flange guiding the first side of the first row of rolling elements and does not include any flange guiding the second side of the first row of rolling elements, the second bearing ring includes a second flange guiding the second side of the first row of rolling elements and does not include any flange guiding the first side of the first row of rolling elements, the third bearing ring includes a third flange guiding the first side of the second row of rolling elements and does not include any flange guiding the second side of the second row of rolling elements, and the fourth bearing ring includes a fourth flange guiding the second side of the second row of rolling elements and does not include any flange guiding the first side of the second row of rolling elements.

Further advantages and advantageous designs are indicated in the description, drawings, and the claims. Here in particular the combinations of features specified in the description and in the drawings are purely exemplary, so that the features can also be present individually or combined in other ways.

In the following the disclosure shall be described in more detail with reference to the exemplary embodiments depicted in the drawings. Here the exemplary embodiments and the combinations shown in the exemplary embodiments are purely exemplary and are not intended to define the scope of the disclosure. This scope is defined solely by the pending claims.

DETAILED DESCRIPTION

In the following, identical or functionally equivalent elements are designated by the same reference numbers.

Figure 1:
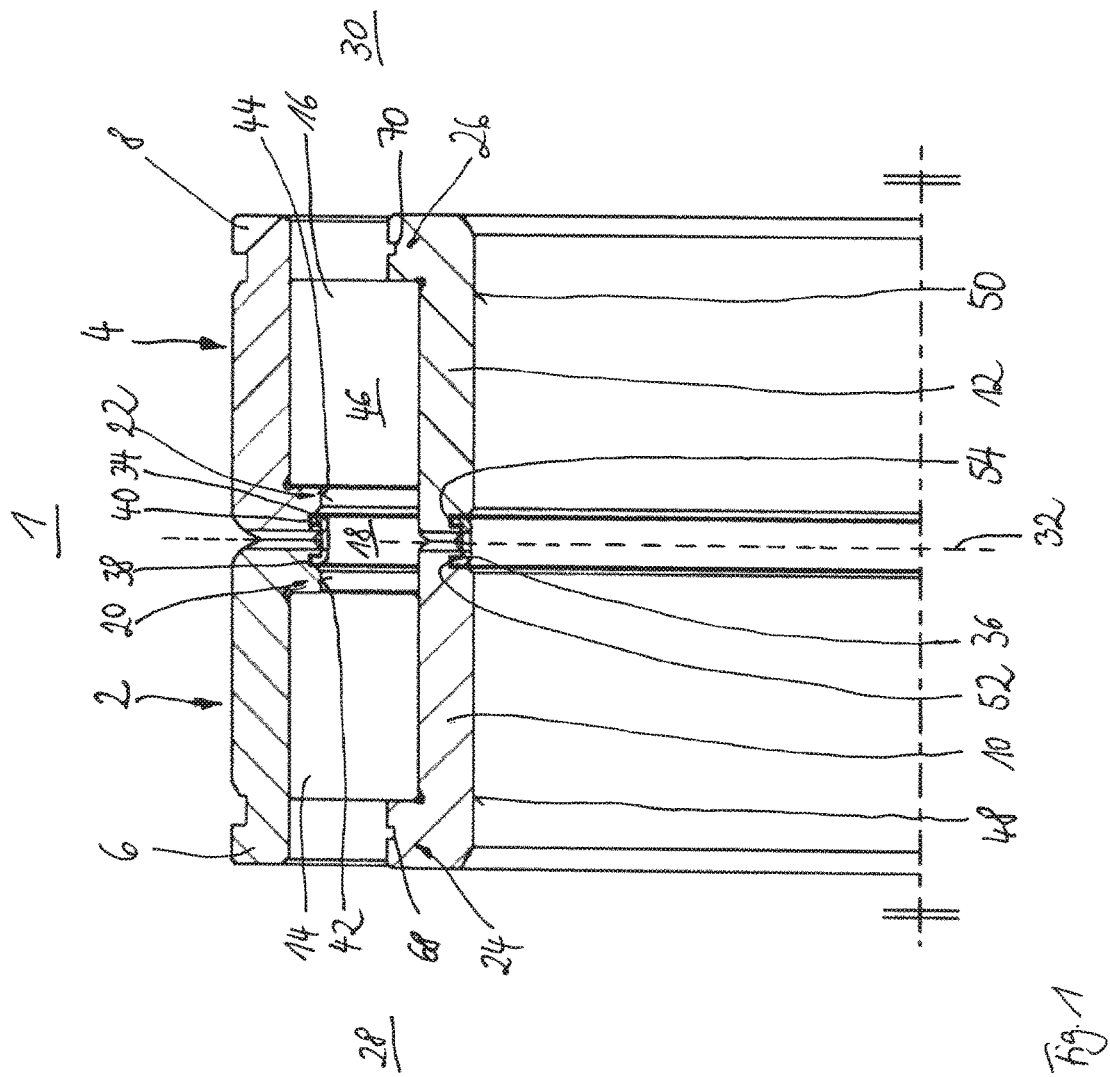
FIG. 1 is a schematic cross-sectional view through an inventive bearing assembly.
Figure 2:
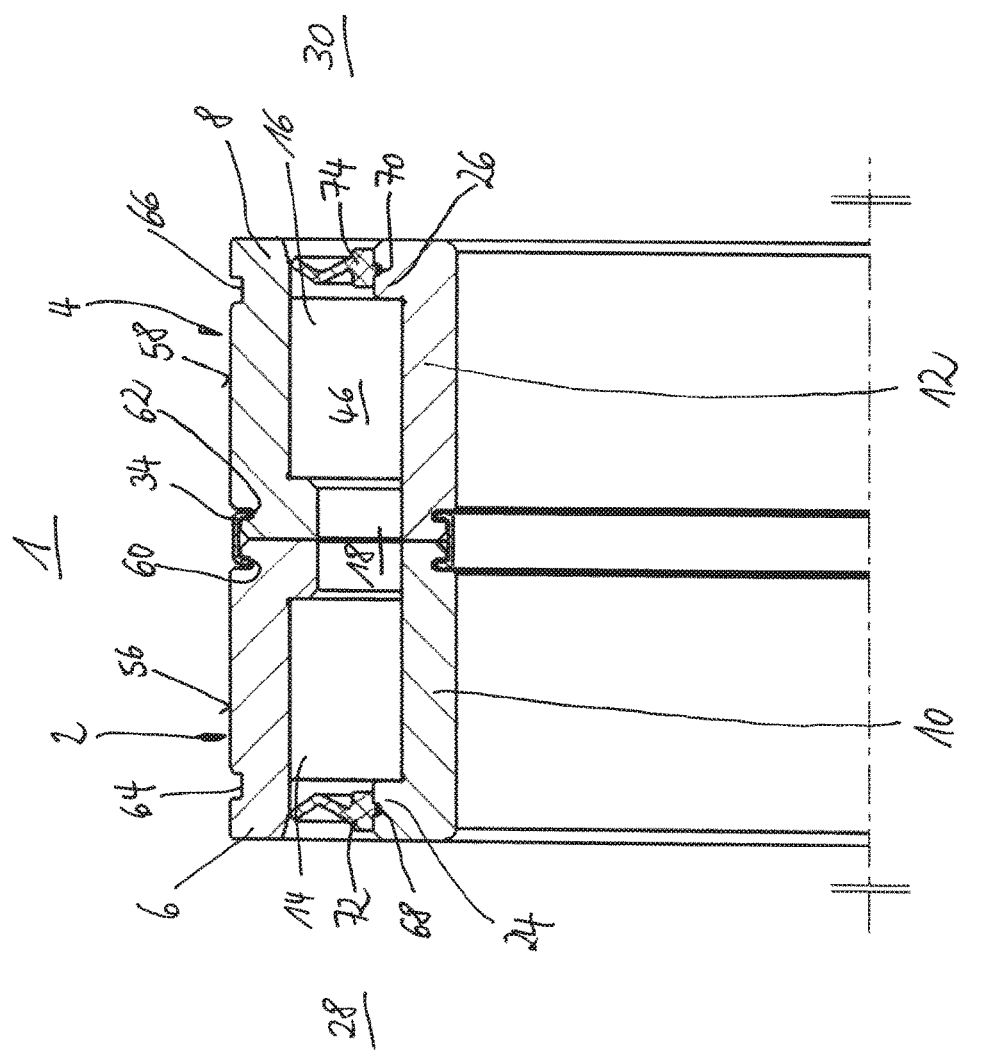
FIG. 2 is a schematic cross-sectional view through a further exemplary embodiment of the inventive bearing assembly.

FIGS. 1 and 2 show schematic cross-sectional views through a double row bearing assembly 1, which is configured as a double row cylindrical roller bearing 2, 4, wherein the two cylindrical roller bearings 2, 4 are axially adjacent. Such a cylindrical roller bearing 1 can be used in particular for supporting cable sheaves in cranes.

As depicted in FIGS. 1 and 2, the double row cylindrical roller bearing assembly 1 includes two first bearing rings 6, 8, which are configured as bearing outer rings, and two second bearing rings 10, 12, which are configured as bearing inner rings. Between the bearing outer rings 6, 8 and the bearing inner rings 10, 12 two rows of rolling elements 14, 16 are disposed, which, as shown in FIGS. 1 and 2, are configured as cylindrical rollers. The two rolling-element rows 14, 16 are axially spaced and form an intermediate space 18 therebetween. Furthermore, FIGS. 1 and 2 show that the cylindrical roller bearings 2, 4 are each configured full-complement.

As furthermore shown in FIGS. 1 and 2, it is inventively provided that the bearing outer rings 6, 8 each include only a first flange 20, 22 that extends radially in the intermediate space 18 so that the first flange 20, 22 respectively supports the rolling elements 14, 16 in the intermediate space 18. In contrast, the bearing inner rings 10, 12 include only one second flange 24, 26 that respectively supports the rolling elements 14, 16 on a side 28, 30 remote from the intermediate space 18. Due to the design of respectively only one flange 20, 22, 24, 26 on each of the bearing rings 6, 8, 10, 12 it is possible to produce the respective bearing rings 6, 8, 10, 12 separately and thus more simply and more cost-effectively, since a technically complex as well as work- and time-intensive design of a further flange on the respective bearing ring 6, 8, 10, 12 is omitted. As furthermore depicted in FIGS. 1 and 2, in comparison to the prior art, the bearing rings 6, 8, 10, 12 of the bearing assembly include fewer flanges 20, 22, 24, 26, yet a secure guiding of the rolling element rows 14, 16 is nonetheless possible due to the disclosed bearing assembly 1 as explained in the following.

In order to securely support the rolling element rows 14, 16, the two cylindrical roller bearings 2, 4 are configured essentially mirror-symmetric with respect to each other. Here as depicted in FIGS. 1 and 2 the flanges 20, 22 of the two bearing outer rings 6, 8 are disposed facing each other in relation to an imaginary mirror axis and extend, as described above, in the intermediate space 18. In contrast, the flanges 24, 26 of the two bearing inner rings oppose each other with respect to the imaginary mirror axis 32 on the sides 28, 30 remote from the intermediate space 18. Thus the rolling element row 14 can be supported and securely guided in operation between the flange 20 of the bearing outer ring 6 and the flange 24 of the bearing inner ring 10, and the rolling element row 16 can be supported, and securely guided in operation, between the flange 22 of the bearing outer ring 6 and the flange 26 of the bearing inner ring 12.

Furthermore the two axially adjacent cylindrical roller bearings 2, 4 are fixed to each other axially via interference fit in order to provide a stable bearing assembly 1 that has a high load-bearing capacity and stiffness. Here the two axially adjacent bearing outer rings 6, 8, as shown in FIGS. 1 and 2, are connected to each other via a first retaining ring 34, and the two axially adjacent bearing inner rings 10, 12 are connected to each other via a second retaining ring 36. As depicted in particular in FIG. 1, the retaining ring 34 engages in correspondingly configured recesses 38, 40 on the two bearing outer rings 6, 8, which recesses 38, 40 are disposed in a radially inwardly directed surface 42, 44 of the flange 20, 22. In order to connect the bearing inner rings 10, 12 to each other axially using the retaining ring 36, the bearing inner rings 10, 12 each include recesses 52, 54 on an outer surface 48, 50 remote from a bearing interior 46, into which recesses 52, 54 the retaining ring engages. Here the recesses 38, 40, 52, 54, as shown in FIGS. 1 and 2, are respectively configured as annular grooves. Thus the bearing outer rings 6, 8 and the bearing inner rings 10, 12 can be axially fixed to each other via a simple clip mechanism. Alternatively it is also possible to form discrete, preferably circumferentially distributed, recesses in the respective bearing ring 6, 8, 10, 12, into which recesses discretely formed retaining elements then engage.

FIG. 2 shows a further exemplary embodiment wherein the retaining ring 34 is respectively disposed on an outer surface 56, 58 of the bearing outer rings 6, 8, which outer surface 56, 58 faces away from the bearing interior 46, and the retaining ring 34 engages in corresponding recesses 60, 62 on the bearing outer rings 6, 8. In addition, the bearing outer rings 6, 8, as further shown in FIGS. 1 and 2, can each have further recesses 64, 66 on the outer surfaces 56, 58 remote from the bearing interior 46, which further recess 64, 66 serve, for example, for receiving of spring rings (not shown).

Furthermore FIGS. 1 and 2 show that the flanges 24, 26 of the bearing inner rings 10, 12 can also include recesses 68, 70, which, as shown in particular in FIG. 2, each serve for the receiving of seals 72, 74.

Overall with the disclosed multi-row bearing assembly a simple-to-produce and cost-effective bearing assembly can be provided that includes at least two axially adjacent rolling-element bearings, in particular cylindrical rolling-element bearings. Such a bearing assembly can be formed, for example, as a double row cylindrical roller bearing for a cable sheave of a crane and be used as a cable sheave bearing. Here each of the at least two axially adjacent rolling-element bearings include a first and a second bearing ring, between which rows of rolling elements are respectively disposed. Here the two axially adjacent rolling-element rows form an intermediate space therebetween. Furthermore the first bearing rings each only include one flange that is designed to support the rolling elements in the intermediate space, while the second bearing rings each only include a second flange that is designed to support the rolling elements on a side remote from the intermediate space.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2, 4 Cylindrical roller bearing
6, 8 First bearing ring
10, 12 Second bearing ring
14, 16 Rolling element rows
18 Intermediate space
20, 22 First flange
24, 26 Second flange
28, 30 Side remote from intermediate space
32 Mirror axis
34, 36 Retaining ring
38, 40 Recess on the flange of the bearing outer ring
42, 44 Radially inwardly directed surface
46 Bearing interior
48, 50 Outer surface of the bearing inner ring, which outer surface faces away from the bearing interior
52, 54 Recess on the outer surface of the bearing inner ring, which outer surface faces away from the bearing interior
56, 58 Outer surface of the bearing outer ring, which outer surface faces away from the bearing interior
60, 62, 64, 66 Recess on the outer surface of the bearing outer ring, which outer surface faces away from the bearing interior
68, 70 Recess on the flange of the bearing inner ring
72, 74 Seal

What is claimed is:

1. A multi-row bearing assembly comprising:
a first rolling-element bearing having a first bearing ring and a second bearing ring and a first row of rolling elements between the first bearing ring and the second bearing ring, the first bearing ring and the second bearing ring each having exactly one rolling-element guide flange;
a second rolling-element bearing axially adjacent to and formed separately from the first rolling-element bearing, the second rolling-element bearing having a third bearing ring and a fourth bearing ring and a second row of rolling elements between the third bearing ring and the fourth bearing ring, the third bearing ring and the fourth bearing ring each having exactly one rolling-element guide flange; and
an intermediate space between the first row of rolling elements and the second row of rolling elements,
wherein the first row of rolling elements has a first side facing the intermediate space and a second side remote from the intermediate space and the second row of rolling elements has a first side facing the intermediate space and a second side remote from the intermediate space,
wherein the guide flange of the first bearing ring is configured to guide the first side of the first row of rolling elements and the guide flange of the third bearing ring is configured to guide the first side of the second row of rolling elements and the guide flange of the second bearing ring is configured to guide the second side of the first row of rolling elements and the guide flange of the fourth bearing ring is configured to guide the second side of the second row of rolling elements,
wherein the first bearing ring and the third bearing ring each includes an annular groove and a retaining ring engaged in the annular grooves to connect the first bearing ring to the third bearing ring, and
wherein the annular groove of the first bearing ring is disposed on a radially inwardly directed surface of the guide flange of the first bearing ring and the annular groove of the third bearing ring is disposed on a radially inwardly directed surface of the guide flange of the third bearing ring.

2. The multi-row bearing assembly according to claim 1, wherein the first bearing ring is connected to the third bearing ring via an interference fit.

3. The multi-row bearing assembly according to claim 2, wherein the retaining ring is a clip connecting the first bearing ring to the third bearing ring.

4. The multi-row bearing assembly according to claim 1, wherein the first rolling-element bearing and the second rolling-element bearing are disposed essentially mirror-symmetrically with respect to each other.

5. The multi-row bearing assembly according to claim 1, wherein the first bearing ring is an outer bearing ring of the first rolling-element bearing and the third bearing ring is an outer ring of the second rolling-element bearing.

6. The multi-row bearing assembly according to claim 1, wherein the second bearing ring is an inner bearing ring of the first rolling-element bearing and the fourth bearing ring is an inner ring of the second rolling-element bearing.

7. A cable sheave bearing comprising the multi-row bearing assembly according to claim 1.

8. A multi-row bearing assembly comprising:
a first rolling-element bearing having a first bearing ring and a second bearing ring and a first row of rolling elements between the first bearing ring and the second bearing ring, the first bearing ring and the second bearing ring each having exactly one rolling-element guide flange;
a second rolling-element bearing axially adjacent to and formed separately from the first rolling-element bearing, the second rolling-element bearing having a third bearing ring and a fourth bearing ring and a second row of rolling elements between the third bearing ring and the fourth bearing ring, the third bearing ring and the fourth bearing ring each having exactly one rolling-element guide flange; and
an intermediate space between the first row of rolling elements and the second row of rolling elements,
wherein the first row of rolling elements has a first side facing the intermediate space and a second side remote from the intermediate space and the second row of rolling elements has a first side facing the intermediate space and a second side remote from the intermediate space,
wherein the guide flange of the first bearing ring is configured to guide the first side of the first row of rolling elements and the guide flange of the third bearing ring is configured to guide the first side of the second row of rolling elements and the guide flange of the second bearing ring is configured to guide the second side of the first row of rolling elements and the guide flange of the fourth bearing ring is configured to guide the second side of the second row of rolling elements, wherein the first bearing ring and the third bearing ring each includes an annular groove and a retaining ring engaged in the annular grooves to connect the first bearing ring to the third bearing ring, wherein the annular groove of the first bearing ring is disposed on a radially outwardly directed surface of the first bearing ring and the annular groove of the third bearing ring is disposed on a radially outwardly directed surface of the third bearing ring, and wherein the radially outward directed surface of the first bearing ring faces away from the bearing interior and the radially outward directed surface of the third bearing ring faces away from the bearing interior.

9. A multi-row bearing assembly comprising:

a first rolling-element bearing having a first bearing ring and a second bearing ring and a first row of rolling elements between the first bearing ring and the second bearing ring, the first bearing ring and the second bearing ring each having exactly one rolling-element guide flange;

a second rolling-element bearing axially adjacent to and formed separately from the first rolling-element bearing, the second rolling-element bearing having a third bearing ring and a fourth bearing ring and a second row of rolling elements between the third bearing ring and the fourth bearing ring, the third bearing ring and the fourth bearing ring each having exactly one rolling-element guide flange; and an intermediate space between the first row of rolling elements and the second row of rolling elements, wherein the first row of rolling elements has a first side facing the intermediate space and a second side remote from the intermediate space and the second row of rolling elements has a first side facing the intermediate space and a second side remote from the intermediate space, wherein the guide flange of the first bearing ring is configured to guide the first side of the first row of rolling elements and the guide flange of the third bearing ring is configured to guide the first side of the second row of rolling elements and the guide flange of the second bearing ring is configured to guide the second side of the first row of rolling elements and the guide flange of the fourth bearing ring is configured to guide the second side of the second row of rolling elements, wherein the first bearing ring and the third bearing ring each includes an annular groove and a retaining ring engaged in the annular grooves to connect the first bearing ring to the third bearing ring, and wherein the annular groove of the first bearing ring faces an interior of the bearing assembly and the annular groove of the third bearing ring faces the interior of the bearing assembly.

10. A multi-row bearing assembly comprising:

a first rolling-element bearing having a first bearing ring and a second bearing ring and a first row of rolling elements between the first bearing ring and the second bearing ring;

a second rolling-element bearing axially adjacent to and formed separately from the first rolling-element bearing, the second rolling-element bearing having a third bearing ring and a fourth bearing ring and a second row of rolling elements between the third bearing ring and the fourth bearing ring; and an intermediate space between the first row of rolling elements and the second row of rolling elements, wherein the first row of rolling elements has a first side facing the intermediate space and a second side remote from the intermediate space and the second row of rolling elements has a first side facing the intermediate space and a second side remote from the intermediate space, wherein the first bearing ring includes a first flange guiding the first side of the first row of rolling elements and does not include any flange guiding the second side of the first row of rolling elements, wherein the second bearing ring includes a second flange guiding the second side of the first row of rolling elements and does not include any flange guiding the first side of the first row of rolling elements, wherein the third bearing ring includes a third flange guiding the first side of the second row of rolling elements and does not include any flange guiding the second side of the second row of rolling elements, and wherein the fourth bearing ring includes a fourth flange guiding the second side of the second row of rolling elements and does not include any flange guiding the first side of the second row of rolling elements, wherein the first bearing ring and the third bearing ring each includes an annular groove and a first retaining ring engaged in the annular grooves to connect the first bearing ring to the third bearing ring, and wherein the second bearing ring and the fourth bearing ring each includes an annular groove and a second retaining ring engaged in the annular grooves to connect the second bearing ring to the fourth bearing ring.

11. The multi-row bearing assembly according to claim 10, wherein the first bearing ring is connected to the third bearing ring via an interference fit, and wherein the second bearing ring is connected to the fourth bearing ring via an interference fit.

12. The multi-row bearing assembly according to claim 10, wherein the first retaining ring is a clip connecting the first bearing ring to the third bearing ring, and wherein the second retaining ring is a clip connecting the second bearing to the fourth bearing ring.

13. The multi-row bearing assembly according to claim 10, wherein the first rolling-element bearing and the second rolling-element bearing are disposed essentially mirror-symmetrically with respect to each other.

14. The multi-row bearing assembly according to claim 10, wherein the first bearing ring is an outer bearing ring of the first rolling-element bearing and the third bearing ring is an outer ring of the second rolling-element bearing.

15. The multi-row bearing assembly according to claim 10, wherein the second bearing ring is an inner bearing ring of the first rolling-element bearing and the fourth bearing ring is an inner ring of the second rolling-element bearing.

* * * * *